United States Patent [19]

Lewarchik et al.

[11] Patent Number: 4,530,977

[45] Date of Patent: Jul. 23, 1985

[54] LOW TEMPERATURE-CURING POLYESTER URETHANE SYSTEMS

[75] Inventors: Ronald J. Lewarchik, Arlington Heights; Gerry K. Noren, Hoffman Estates; Ronald Metcalfe, Addison; Demetrius J. Bonin, Oak Park; Erwin S. Poklacki, Arlington Heights, all of Ill.

[73] Assignee: DeSoto, Inc., Des Plaines, Ill.

[21] Appl. No.: 636,020

[22] Filed: Jul. 30, 1984

[51] Int. Cl.$^3$ .................... C08G 18/10; C08G 18/32; C08G 63/76

[52] U.S. Cl. .................................. 525/443; 528/84; 528/85; 525/440; 525/444; 525/453; 525/457

[58] Field of Search ................... 528/84, 85; 525/440, 525/443, 444, 453, 457

[56] References Cited

U.S. PATENT DOCUMENTS

| | | | |
|---|---|---|---|
| 3,666,835 | 5/1972 | Schloss | 528/66 |
| 3,726,835 | 4/1973 | Bertozzi | 260/75 NH |
| 3,907,863 | 9/1975 | Voss | 260/468 K |
| 4,017,556 | 4/1977 | Wang | 525/456 |
| 4,021,505 | 5/1977 | Wang | 525/443 |
| 4,130,692 | 12/1978 | Anderson et al. | 525/443 |
| 4,387,194 | 6/1983 | Ottaviani et al. | 525/454 |
| 4,451,622 | 5/1984 | DiDomenico | 525/456 |

*Primary Examiner*—Herbert S. Cockeram
*Attorney, Agent, or Firm*—Dressler, Goldsmith, Shore, Sutker & Milnamow

[57] ABSTRACT

An hydroxy-functional polyurethane reaction product is disclosed which enables the provision of thermosetting solution coating compositions which cure at low temperature to form flexible coatings. These polyurethanes are provided by the reaction of an organic diisocyanate with a stoichiometric excess of an essentially linear hydroxy-functional polyester which is the polyesterification reaction product of $C_4$–$C_{10}$ aliphatic dicarboxylic acid or anhydride thereof with a stoichiometric excess of $C_3$–$C_8$ aliphatic diol providing an alcohol/acid molar ratio of 3/2 to 6/5. The reaction is substantially complete as indicated by an acid number less than 10, and the diisocyanate is used in an amount providing an NCO/OH ratio of from $\frac{2}{3}$ to 12/13. The thermosetting solution coating composition is provided by an organic solvent having dissolved therein from 5–50% of total resin solids of a curing agent reactive with hydroxy groups together with the polyurethane which has been described. The preferred curing agent is a partially methylolated melamine which contains from about 5 mol percent to about 40 mol percent of the methylol group.

13 Claims, No Drawings

LOW TEMPERATURE-CURING POLYESTER URETHANE SYSTEMS

DESCRIPTION

1. Technical Field

The invention relates to polyester-based hydroxy-functional polyurethanes which are particularly adapted to provide low temperature-curing thermosetting coatings.

2. Background Art

The use of thermoplastic moldings, especially in the automotive industry, requires that these moldings be coated to provide superior surface characteristics. In turn, this demands that the coatings cure rapidly at low curing temperature, and that the cured coating still exhibit excellent properties from the standpoint of flexibility. The coatings must provide good resistance to weathering and good stability on heat aging. Thus, the coating must cure completely even though the cure conditions are minimal. A more vigorous cure is ruled out because of the thermoplastic nature of the moldings which is preferably constituted by a blend of polycarbonate and polybutylene terephthalate resins. These blends provide excellent impact resistance, but the invention is also applicable to other thermoplastic or thermoset moldings and laminates and is of general utility where one desires to obtain a highly flexible weather-resistant and solvent-resistant coating while minimizing the energy consumed in the bake.

DESCRIPTION OF INVENTION

In accordance with this invention, a resinous hydroxy-functional polyurethane reaction product of special character is combined with a conventional curing agent reactive with hydroxy groups, preferably a partially methylolated melamine. The hydroxy-functional polyurethane reaction product is the reaction product of an aliphatic diisocyanate with a stoichiometric excess of an essentially linear hydroxy-functional polyester in which the polyester is the polyesterification reaction product of a $C_4$–$C_{10}$ aliphatic dicarboxylic acid or anhydride thereof with a stoichiometric excess of a $C_3$–$C_8$ aliphatic diol providing an alcohol/acid molar ratio of 3/2 to 6/5, and having an acid number less than 10 which indicates that the reaction is substantially complete. The diisocyanate is used in an amount providing an NCO/OH ratio of from ⅔ to 12/13.

To illustrate the foregoing, an aliphatic dicarboxylic acid, like azelaic acid, is polyesterified with excess 1,4-butane diol to an acid number below 10, and the hydroxy-functional polyester so-produced is reacted with a stoichiometric deficiency of an organic diisocyanate, which is preferably aliphatic like dicyclohexylmethane-4,4′ diisocyanate, to provide an hydroxy-functional polyurethane. This is done in organic solvent solution. A curing agent reactive with the hydroxy group of the polyurethane reaction product, preferably a partially methylolated melamine, is added to the solution in an amount of from 5–50% of the total weight of resin solids, to make possible the curing of the resin at a low curing temperature, in the range of from about 150° F. to 250° F.

Proportions are vital to this invention. The dicarboxylic acid or its anhydride and the aliphatic diol are combined in an alcohol/acid molar ratio of 3/2 to 6/5. Larger proportions of alcohol produce too low a molecular weight, and smaller proportions of alcohol produce too high a molecular weight. The reaction is continued to substantial completion which is identified by an acid number less than 10, preferably less than 5. In normal practice, the product at 100% solids is a solid hydroxy-functional polyester resin having a low melting point, preferably in the range of 30° C. to 50° C.

The diisocyanate is then reacted with the hydroxy-functional polyester in an amount to provide an NCO/OH ratio of from ⅔ to 12/13, preferably from ¾ to 7/8. The urethane reaction goes to substantial completion, and at the named ratio substantially all of the NCO functionality is consumed. This provides an hydroxy-functional polyurethane which is highly soluble in organic solvents and unusually reactive. This high reactivity allows a low temperature cure to proceed rapidly to completion to form cured films which are exceptionally flexible, a result which is attributed to the great mobility of the hydroxy terminal groups in the polyurethane product as a result of the entirely aliphatic character of all of the selected components, and also to the careful control of proportions, as has been described.

The resulting resinous polyurethane is highly soluble, and it can be used, preferably in methyl ethyl ketone solutions having a solids content of from 60% to 72%, which provides desirable coating solutions containing very little organic solvent. While diverse solvents, such as butyl acetate and 2-ethoxyethanol acetate, are useful herein, the preferred solvent medium contains a major weight proportion of methyl ethyl ketone. As will be appreciated, high solids compositions minimizes the amount of solvent which is required to apply a given quantity of resin, so the high solids content of the solutions of this invention provides an important economy, and the reduced amount of solvent liberated to the atmosphere minimizes pollution.

The $C_4$–$C_{10}$ dicarboxylic acids which can be used form a small group of known compounds which are typically illustrated by adipic acid and azelaic acid. It is preferred that the major weight proportion of this component be supplied by adipic acid. As is well known, any of these acids can be dehydrated to provide the corresponding anhydride, and these are also useful herein. These acids are useful alone or in admixture with one another.

The diols which can be used also form a small group of well known compounds. It is preferred to have the two hydroxy groups at opposite ends of the aliphatic base, such as in the preferred diol, viz., 1,4-butane diol. However, 1,6-hexane diol is also very useful. 1,2-propane diol and 1,2-butane diol are also useful, though less preferred.

The esterification reaction is entirely conventional and is illustrated in the examples. One can proceed with a catalyst or without one, though it is usual to have a small amount of an acid catalyst, like para toluene sulfonic acid, present.

The useful proportions have already been described, and these include the presence of excess alcohol. The polyesterification reaction between the dicarboxylic acid and the diol is continued until almost all of the acid is consumed. An acid number less than 5 is preferred, and a final acid number (of the solution) of about 3 is typical.

The final hydroxy number will range from about 50 to about 170, and is preferably in the range of 60–90. This follows from the proportions noted previously.

Other hydroxy and carboxy components are preferably excluded from the polyester, but it will be understood that small amounts of diverse components which do not change the essential character of the polyester can be tolerated. Thus, up to about 3% of octanol or trimellitic anhydride may be tolerated without unduly modifying the properties sought herein.

The preferred aliphatic diisocyanates are also well known, such as isophorone diisocyanate or hexamethylene diisocyanate, and any of these may be used in accordance with this invention. Aromatic diisocyanates, such as toluene diisocyanate, can be used where light stability is not important, as in a primer.

Various curing agents may be used, including aminoplast resins, phenoplast resins and blocked polyisocyanates. Aminoplast resins are illustrated by hexamethoxymethyl melamine, tetramethylol benzoguanamine and urea formaldehyde condensates. Phenoplast resins are illustrated by phenol-formaldehyde condensates. Blocked polyisocyanates are illustrated by octanol-blocked isophorone or toluene diisocyanate. However, best results from the standpoint of low temperature cure are obtained using a partially methylolated melamine, such as one which contains from about 5 mol percent to about 40 mol percent of the methylol group. This provides rapid reactivity and limited branching which results in highly flexible cured films. Commercial products which may be used to provide the preferred curing agents are Cymel products 323, 325, 327 and 370 from American Cyanamid and Monsanto product 717. As previously indicated, the curing agent is used in an amount of from 5% to 50% of total resin solids, preferably in an amount of from 25% to 45% of total resin solids.

The coatings of this invention can be applied in diverse ways, but are preferably applied by spraying, air spray being typical. The coated thermoplastic molding are cured in ovens maintained at temperatures of about 180° F. for 30 minutes. This is an unusually low temperature to provide a complete cure within such a moderate amount of time. At these low temperatures and with the small amount of methyl ethyl ketone solvent present, the thermoplastic substrates are not damaged. The cure is complete as evidenced by solvent resistance and weather resistance, and also by resistance to becoming brittle when subjected to heat aging after cure.

The coatings of this invention may be clear or pigmented, and auxiliary agents may be present for special purpose. Thus, it is permissible to include from 2–8% by weight, preferably about 4% of cellulose acetate butyrate which has been mixed with aluminum flakes. The preferred amount of aluminum flakes is about 8% by weight.

The spray application will typically apply up to about 1.5 to 2.0 mils of coating. When a clear coating is applied, it will typically be used in a thickness of 1.0 to 2.0 mils while pigmented coatings are usually thinner, namely: from 0.5 to 1.0 mil.

While the coatings of this invention are very flexible, they are still hard enough to resist scratching with the fingernail.

Throughout this application and in the claims which follow, all parts and proportions are by weight, unless otherwise stated. The invention is illustrated in the following examples.

EXAMPLE 1

(Preparation of Polyester Precursor)

Adipic acid (31.05 moles), azelaic acid (24.87 moles) and 1.4-butanediol (75.54 moles) were placed in a 22 liter 4 neck round bottom flask equipped with stirrer, thermometer, 7 plate Snyder column, Dean-Stark trap, condenser and $N_2$ purge. The above was heated under $N_2$ over a temperature range of 140°–230° C. for a period of 21 hours. After the first 14 hours, xylene (300 ml) was added to enhance distillate recovery. During the above 21 hour period, distillate ($H_2O$) was removed. The acid value of the polyester produced was examined via direct titration with 0.1N KOH. A final acid value of 4.3 mg KOH/g sample and a hydroxyl value (PMDA/imidazole method) of 148 mg KOH/g NVM (95.3% NVM) was obtained for the polyester product.

(Preparation of Polyester-urethane)

To a 22 liter 4 neck round bottom flask equipped with stirrer, thermometer, condenser and $N_2$ purge was added: polyester precursor as prepared above (7500 g, 95.3% NVM), urethane grade methyl ethyl ketone (5101 g) and dibutyl tin dilaurate (5.5 g). Dicyclohexylmethane-4,4' diisocyanate (Desmodur W may be used) (2100 g) was then added in three equal portions over 45 minutes to the above solution. A slight exotherm (10° C. over 3 hours) was noted. The above was then heated to 60° C. and maintained at that temperature for 18 hours. Percent residual isocyanate was determined throughout the reaction via the n-butylamine titration method. The resulting polyester-urethane resin exhibited the following characteristics: % NCO:none detected, % NVM:64.8, hydroxyl value:20 mg KOH/g NVM and acid value:3.4 mg KOH/g NVM.

EXAMPLE 2

A partially methylolated melamine containing 8 mol percent of the methylol group is provided in 80% solids solution in n-butanol (American Cyanamide product Cymel 325 may be used). This solution is then combined with the solution product of example 1 using the following formulation in which all parts are by weight.

| Parts | Component |
|-------|-----------|
| 1153 | polyurethane resin solution of Example 1 |
| 508 | methylolated melamine described above |
| 92 | phenyl acid phosphate (Mobil product PA 75 may be used) |
| 30 | cellulose acetate butyrate (Eastman Chemical product CAB 381-20 may be used) |
| 23 | phenyl benzotriazole ultraviolet absorber (Tinuvin 328 from Ciba Geigy may be used) |
| 47 | Aluminum pigment (Silverline Manufacturing product sparkle silver 5000 AR may be used) |
| 1.0 | silicone lubricant (DC 57 from Dow Corning may be used) |
| 430 | butyl alcohol |
| 655 | VM & P naphtha |
| 264 | methyl ethyl ketone |
| 630 | ethyl alcohol |
| 346 | ethylene glycol n-butyl ether |

The above solution was then applied to moldings made of General Electric Xenoy by spray to deposit coatings having a thickness which ranged from 1.5 to 4.0 mils. These were cured by baking in an oven maintained at 180° F. for 30 minutes. The resulting coatings resisted methyl ethyl ketone solvent, had acceptable chemical resistance to water, hydrochloric acid solution, soap solution and gasoline, and performed well on artificial weathering testing. They were hard enough to resist fingernail scratching and were highly flexible.

What is claimed is:

1. An hydroxy-functional polyurethane resinous reaction product of an organic diisocyanate with a stoichiometric excess of an essentially linear hydroxy-functional polyester, said polyester being the polyesterification reaction product of $C_4$–$C_{10}$ aliphatic dicarboxylic acid or anhydride thereof with a stoichiometric excess of $C_3$–$C_8$ aliphatic diol providing an alcohol/acid molar ratio of 3/2 to 6/5, said polyester having an acid number of less than 10, and said diisocyanate being used in an amount providing an NCO/OH ratio of from $\frac{2}{3}$ to 12/13.

2. A polyurethane as recited in claim 1 in which said diisocyanate is aliphatic.

3. A polyurethane as recited in claim 1 which is a solid resin which melts within the range of 30° C. to 50° C.

4. A polyurethane as recited in claim 1 in which said alcohol to acid ratio is about 5/4 and said NCO/OH ratio is about $\frac{3}{4}$ to 7/8.

5. A polyurethane as recited in claim 1 in which said dicarboxylic acid comprises a major weight proportion of adipic acid, and said diol is 1,4-butane diol.

6. A polyurethane as recited in claim 4 in which said dicarboxylic acid comprises a major weight proportion of adipic acid, said diol is 1,4-butane diol, and said polyester has an acid number less than 5 and an hydroxy number of about 50 to about 170.

7. A thermosetting solution coating composition which cures at low baking temperature to form a flexible film comprising organic solvent having dissolved therein from 5–50% of total resin solids of a curing agent reactive with hydroxy groups, and an hydroxy-functional polyurethane reaction product of an aliphatic diisocyanate with a stoichiometric excess of an essentially linear hydroxy-functional polyester, said polyester being the polyesterification reaction product of $C_4$–$C_{10}$ aliphatic dicarboxylic acid or anhydride thereof with a stoichiometric excess of $C_3$–$C_8$ aliphatic diol providing an alcohol/acid molar ratio of 3/2 to 6/5, said polyester having an acid number of less than 10, and said diisocyanate being used in an amount providing an NCO/OH ratio of from $\frac{2}{3}$ to 12/13.

8. A thermosetting solution coating composition which cures at low baking temperature to form a flexible film comprising organic solvent having dissolved therein from 5–50% of total resin solids of a partially methylolated melamine, and an hydroxy-functional polyurethane reaction product of an aliphatic diisocyanate with a stoichiometric excess of an essentially linear hydroxy-functional polyester, said polyester being the polyesterification reaction product of $C_4$–$C_{10}$ aliphatic dicarboxylic acid or anhydride thereof with a stoichiometric excess of $C_3$–$C_8$ aliphatic diol providing an alcohol/acid molar ratio of 3/2 to 6/5, said polyester having an acid number of less than 10, and said diisocyanate being used in an amount providing an NCO/OH ratio of from $\frac{2}{3}$ to 12/13.

9. A thermosetting solution coating composition as recited in claim 8 in which said partially methylolated melamine contains from about 5 mol percent to about 40 mol percent of the methylol group.

10. A thermosetting solution coating composition as recited in claim 9 in which said solution has a resin solids content of from 60–72%.

11. A thermosetting solution coating composition as recited in claim 9 in which said solution has a resin solids content of from 64–70%.

12. A thermosetting solution coating composition as recited in claim 10 in which said alcohol to acid ratio is about 5/4 and said NCO/OH ratio is about $\frac{3}{4}$.

13. A thermosetting solution coating composition as recited in claim 12 in which said dicarboxylic acid comprises a major weight proportion of adipic acid, and said diol is 1,4-butane diol.

* * * * *